United States Patent [19]

Chang

[11] Patent Number: 4,891,632
[45] Date of Patent: Jan. 2, 1990

[54] COMPUTER GRAPHIC DRAWING APPARATUS WITH COARSE AND FINE CONTROLS

[75] Inventor: David Chang, Taipei, Taiwan

[73] Assignee: King Phoenix Co., Ltd., Taipei, Taiwan

[21] Appl. No.: 146,293

[22] Filed: Jan. 20, 1988

[51] Int. Cl.⁴ .............................................. G09G 1/00
[52] U.S. Cl. .................................... 340/710; 340/706; 340/709; 178/18; 273/148 B
[58] Field of Search ..................... 340/706, 709, 710; 178/18; 74/471 XY; 273/148 B

[56] References Cited

U.S. PATENT DOCUMENTS

| | | | |
|---|---|---|---|
| 3,541,521 | 11/1970 | Koster | 340/710 |
| 4,562,347 | 12/1985 | Hovey et al. | 340/710 |
| 4,719,455 | 1/1988 | Louis | 340/709 |
| 4,748,441 | 5/1988 | Brzezinski | 340/706 |

FOREIGN PATENT DOCUMENTS

| | | | |
|---|---|---|---|
| 0107129 | 6/1985 | Japan | 340/710 |
| 0134331 | 7/1985 | Japan | 340/709 |
| 0153538 | 8/1985 | Japan | 340/710 |
| 0181819 | 9/1985 | Japan | 340/709 |
| 0193032 | 10/1985 | Japan | 340/710 |
| 0207921 | 10/1985 | Japan | 340/710 |

Primary Examiner—Gerald Brigance
Attorney, Agent, or Firm—Lackenbach Siegel Marzullo & Aronson

[57] ABSTRACT

An improved computer graphic drawing apparatus having a housing unit adapted for being held in hand during graphic drawing operations, a coarse adjusting device movably disposed in the housing unit, and an IC arrangement disposed in the housing unit and electrically connected to the coarse adjusting device for being coupled with a host computer. The improvement resides in a few adjusting device movably disposed in the housing unit and includes: a tracking member movably installed on one side of the housing unit; a first and a second rotary member separately installed in the housing unit and rotatably engaged with the tracking member for being rotated on X and Y coordinate axes; and a first and a second encoding device respectively provided in the housing unit and electrically connected to the IC arrangement in conjunction with both rotary members so as to effect signal conversion and transmission in accomplishing fine adjustment operations.

7 Claims, 2 Drawing Sheets

COMPUTER GRAPHIC DRAWING APPARATUS WITH COARSE AND FINE CONTROLS

BACKGROUND OF THE INVENTION

This invention relates to a computer graphic drawing apparatus, and more particularly to an improved computer graphic drawing apparatus having a fine adjusting device operatively disposed therein for making fine adjustments through an associated host computer during graphic drawing operations Computer graphics has become one of the major functions of a computer. Graphs, charts, drawings, etc., are usually created with a graphic drawing apparatus or "electric mouse" which is electrically connected to an associated host computer through a transmission interface. The structure of the conventional computer graphic drawing apparatus or electric mouses is shown in FIG. 1 wherein when the housing unit A1 of the electric mouse is operated to move, a steel ball A2 will be moved along with the housing unit A1. If the steel ball A2 moves forward and backward, as the arrows indicate, an Y-axis revolving member A4 rotatably engaged with the steel ball A2 and a Y-axis disk A5 rotatably connected with the revolving member A4, will be moved along with the movement of the steel ball A2. As the Y-axis disk A5 continues to rotate, a plurality of light travel apertures A6 evenly formed in the Y-axis disk A5 will constantly be turned to align with a pair of light passing holes A8 provided in a light shielding plate A7. This plate is disposed in the housing unit A1 over the Y-axis disk A5 so that the red light transmitted from a light transmitter A9 will be intermittently passed through the light passing holes A8, when aligned with the light travel apertures A6, and received by a light receiver A10 from which signals will be fed into the IC. The IC is electrically coupled with an associated host computer (not shown), and the 'cursor' on the CRT of the host computer will be moved in vertical direction. In like manner, when the housing unit A1 is moved horizontally, an X-axis revolving member A11, together with an X-axis disk A12, will be rotated with the 'cursor' of the host computer, effecting a horizontal movement on the CRT. As can be seen from the above description and illustration, the known computer graphic drawing apparatus or electric mouse can only draw long lines and make coarse adjustments during the drawing operations through the movement of steel ball A2. In order to reduce the number of inevitable adjustments during graphic drawing operations, the housing unit A1 must be carefully operated. However, since the steel ball A2 can hardly be kept stable during coarse line drawing operation, it usually takes a great deal of time to accomplish a graphic drawing operation on the CRT terminal.

SUMMARY OF THE INVENTION

It is, accordingly, a primary object of this invention to provide an improved computer graphic drawing apparatus with a fine adjusting device incorporated therein so as to overcome the problems associated with the prior art.

This and other objects of the invention are achieved by the provision of an improved computer graphic drawing apparatus with coarse and fine control. A housing unit of the drawing apparatus is adapted for hand holding operations and is provided with a plurality of push-button switches at a front portion of the housing unit for being respectively coupled with a plurality of switches disposed in a single chip IC means being coupled with a host computer through a transmission interface. A coarse adjusting device is disposed in the housing unit for drawing long lines and making coarse adjustments according to the movement of the housing unit during graphic drawing operation. The improvement of the computer graphic drawing apparatus according to this invention resides in a fine adjusting means movably disposed on one side of the housing unit for making fine adjustments during graphic drawing operations without moving the housing unit. The fine adjusting means comprises a tracking ball adjustably provided at a side portion of the housing unit for being optionally adjusted through a user's thumb during computer graphic drawing operations, an X-axis rotary member and an Y-axis rotary member respectively installed in the housing unit in conjunction with the tracking ball for being separately rotated along with the tracking ball. A pair of encoding means includes: a first rotary disc encoding member and a second rotary disk encoding member, each having a plurality of light traveling apertures evenly formed therein and separately fixed at each end portion of the X-axis and Y-axis rotary members for being driven to rotate along with both rotary members in providing the IC means with encoded signals; a first and a second light shielding plates, each having a plurality of light passing holes provided therein, separately fixed at each end portion of the X-asis and Y-axis rotary members over respective rotary disc encoding members for achieving light passing and shielding effects therewith; a first and a second light transmitting means separately installed in the housing unit in front of respective light shielding plates; and a first and a second light receiving means separately disposed in the housing unit in front of the respective rotary disc encoding members for effecting encoding operations through the light traveling apertures and light passing holes so as to feed the encoded signals into the host computer through the IC means. In this way, fine adjustment made from the tracking ball during computer graphic drawing operations can be accomplished without moving the housing unit.

Other advantages and characteristics of this invention will become apparent from the following detailed description of a preferred embodiment of an improved computer graphic drawing apparatus with coarse and fine controls when read in conjunction with the accompanying drawings.

DETAILED DESCRIPTION OF THE PREFERRED EMBODIMENT

Figures 1, 1A, 1B:
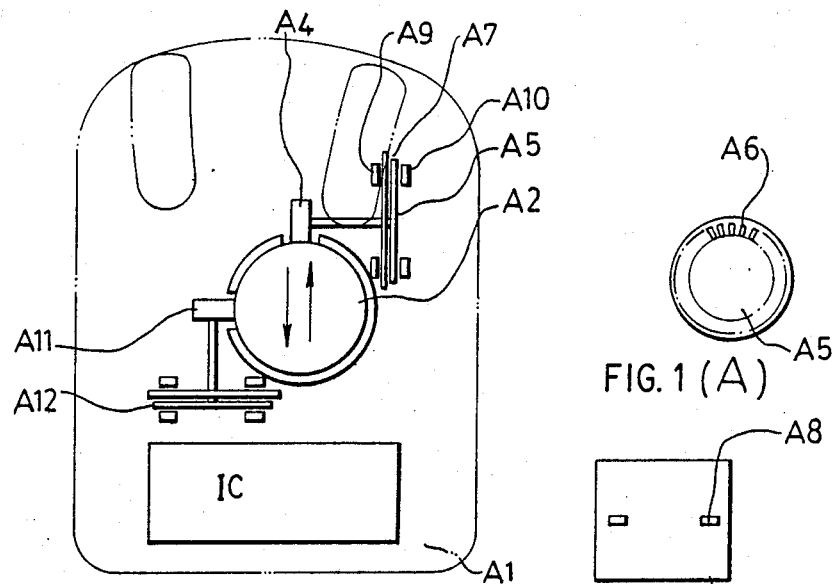
FIGS. 1, 1A, 1B are an illustrative view of a conventional computer graphic drawing apparatus (electric mouse)
Figures 2, 2A, 2B:
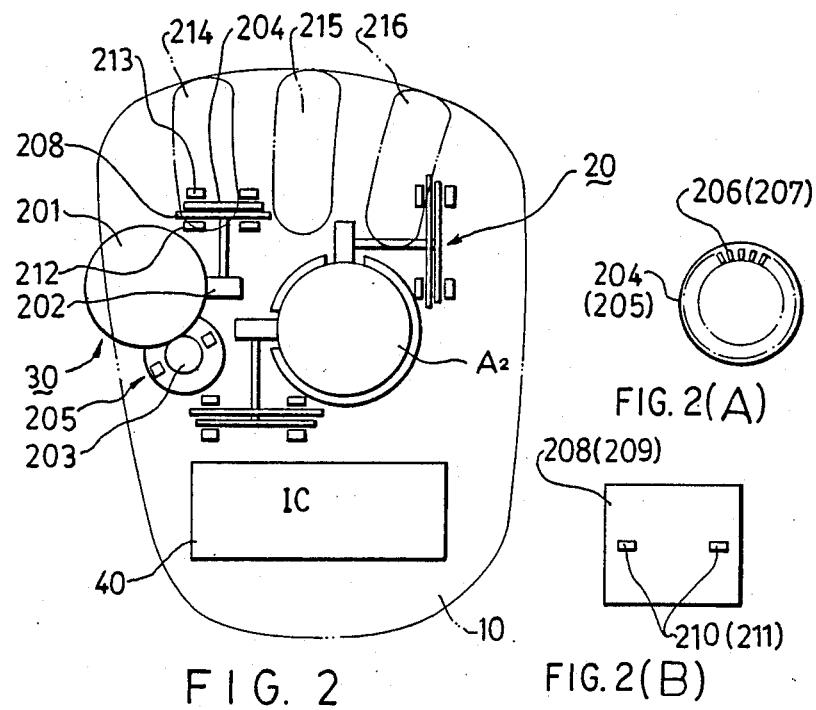
FIGS. 2, 2A, 2B are an illustrative top view of a preferred embodiment of an improved computer graphic drawing apparatus with coarse and find controls according to this invention.

Referring to FIGS. 2 (2A, 2B) and 3, the preferred embodiment of an improved computer graphic drawing apparatus or electric mouse according to this invention includes: a housing unit 10 adapted to be suitably held in hand during graphic drawing operations; a plurality of push buttons 214, 215 and 216 provided at a front portion of the housing unit 10; a coarse adjusting device 20 rotatably disposed in the housing unit 10 for line drawing operations on an X-Y axis basis and for making coarse adjustments along with the movement of housing unit 10; a fine adjusting means 30 adjustably disposed in one side of the housing unit 10 for making a fine adjustment on a X-Y axis basis without moving the housing unit 10 during graphic drawing operations; and a single chip IC 40 disposed in the housing unit 10 and electrically connected to the push buttons 214, 215, 216 through a plurality of switches SW1, SW2, SW3, and to the coarse adjusting device 20 and fine adjusting means 30 for being coupled with an associated host computer 50 through a transmission interface 60. Since the coarse adjusting device 20 and the IC 40 are well known and form no part of this invention, detailed description of these elements is omitted for brevity.

Figure 3:
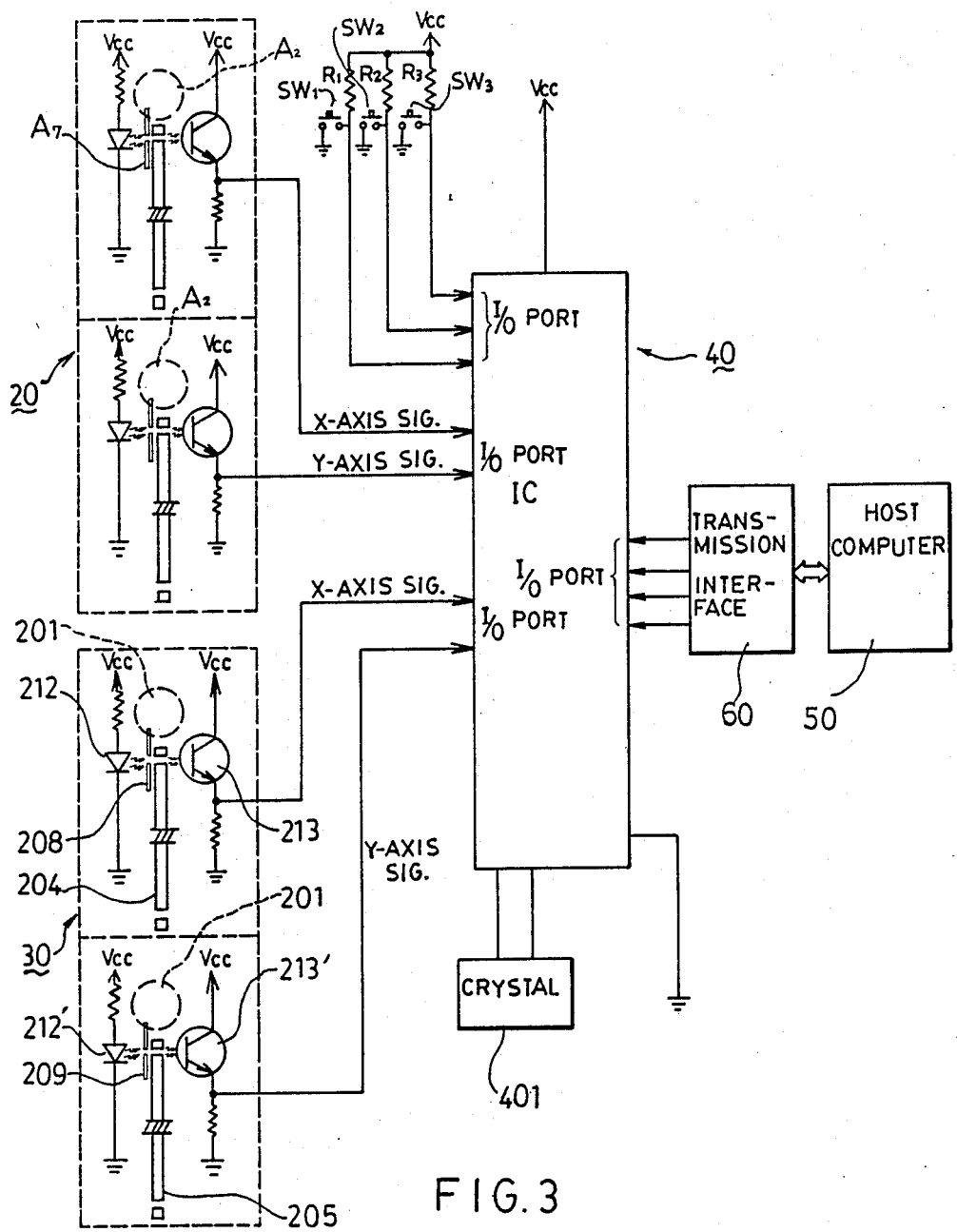
FIG. 3 is a circuit diagram of the preferred embodiment shown in FIG. 2.

The improvement of the preferred embodiment according to this invention resides in the structure of the fine adjusting device 30, which comprises: a tracking ball 201 adjustably disposed at a left side of the housing unit 10 for being suitably manipulated by the user's thumb during graphic drawing operations; a first rotary member 202 of an X coordinate axis and a second rotary member 203 of a Y coordinate axis respectively disposed in the housing unit 10 and rotatably engaged with the tracking ball 201 on one side thereof; a first encoding arrangement composed of: a first rotary disc encoding member 204 with a plurality of light traveling apertures 206 evenly spaced therein, as shown in FIG. 2 (A), rotatably installed at another end of the first rotary member 202; a first light shielding plate 208 with a plurality of light passing holes 210, as shown in FIG. 2 (B), disposed in the housing unit 10 over the first rotary disc encoding member 204; a first red light transmitting means 212 installed in the housing unit 10 in front of the first light shielding plate 208 and electrically connected to the IC means 40; and a first light receiving means 213 disposed in the housing unit 10 in front of the first rotary disc encoding member 204 in conjunction with the first red light transmitting means 212 and electrically connected to the IC means 40; and a second encoding arrangement consisting of: a second roatry disc encoding 205 (which is hidden under the second rotary member 203 and cannot be seen in FIG. 2) with a plurality of light traveling apertures 207 uniformly provided therein and rotatably disposed at another end of the second rotary member 203; a second light shielding plate 209 (which is hidden under the second rotaray member 203 and cannot be seen in FIG. 2) with a plurality of light passing holes 211 (as shown in FIG. 2 (B) fixed in the housing unit 10 over the second rotary disc encoding member 207; a second red light transmitting means 212' (as shown in FIG. 3) installed in the housing unit 10 in front of the second light shielding plated 209 and electrically connected to the IC means 40; and a second light receiving means 213' (as shown in FIG. 3) installed in the housing unit 10 in front of the second rotary disc encoding 205 in conjunction with the second red light transmitting means 212' and electrically connected to the IC means 40. It shall be appreciated that the tracking ball 201 is situated at a place where, when the user holds the housing unit 10 in hand with three fingers (index, middle and ring) touching on the push buttons 214, 215 and 216, the thumb can be conveniently put on the surface of the tracking ball 201 so as to optionally adjust it in cross or diagonal directions for fine adjustment without either moving the housing unit 10 or turning his hand wrist.

As shown in FIG. 3 with reference to FIG. 2, the single chip IC means 40 includes a plurality of I/O ports electrically connected to an associated host computer 50 through a transmission interface 60. A crystal means 401 electrically coupled with the IC means 40 for providing the required clock signals therefrom. In the preferred embodiment, the single chip IC means 40 receives the signals transmitted from the switches SW1, SW2 and SW3, each of which is electrically connected to the respective push buttons 214, 215 and 216 in the housing unit 10, and the signals coming from the coarse adjusting device 20 and fine adjusting means 30. As can be seen in FIG. 3, the first and second red light transmitting means 212 and 212', each of which is composed of an LED circuit, are separately situated in front of respective light shielding plates 208 and 209, and the first and second light receiving means 213 and 213', each of which is composed of a transistor photosensor circuit, are respectively located in front of respective rotary disc encoding members 204 and 205. Consequently, whenever the light traveling apertures 206 and 207 of both rotary disc encoding members 204 and 205 are aligned with the light passing holes 210 and 211 of the light shielding plates 208 and 209 along with the rotation of the first and second rotary members 202 and 203, light signals received from the red light transmitting means 212 and 212' will be converted into electric signals and fed into the IC means 40 for being relayed to the host computer 50 through the transmission interface 60 in effecting drawing control operations. Therefore, when the user's thumb moves the tracking ball 201 in a horizontal direction (left and right), the first rotary member 202 of the X coordinate axis will be rotated, driving the rotary disc encoder 204 to rotate along thereat. Thus, the intermittent alignment of the light travel apertures 206 in the rotary disc encoder 204 and the light passing holes 210 in the light shielding plate 208 will enable the transmitted red light from the light transmitter 212 to be constantly received by the light receiver 213, which in turn feeds the converted signal into the IC means 40 from which the signal will be sent to the host computer 50 through the transmission interface 60, and the 'cursor' on the CRT is moved to make fine adjustments along the X axis without moving the housing unit 10. In like manner, when the tracking ball 201 is vertically adjusted (moved up and down), the rotation of the second rotary disc encoder 205 will cause the 'cursor' on the CRT to make a fine adjustment along the Y axis without moving the housing unit 10. Of course, if the tracking ball 201 is moved in a diagonal direction (such as 45-degrees), the 'cursor' on the CRT will also make a fine movement along the diagonal direction made by the tracking ball 201. As to the switches SW1, SW2 and SW3, which are respectively connected to the push buttons 214, 215 and 216, whenever they are pressed down, commands from the IC means 40 will be sent to the host computer 50 for performing graphic drawing operations according to the movement of both the coarse adjusting device 20 and the fine adjusting means 30. Since the control operation of the switches SW1, SW2 and SW3 is usually executed through a program, which is well known to those skilled in the art, detailed description is hereby omitted.

With this improved computer graphic drawing apparatus, the coarse adjusting device 20 is used to draw large and long-distance lines according to the movement of the housing unit 10 while the fine adjusting means 30 is used to aid the coarse adjusting device 20 in making a supplementary and fine adjustment without moving the housing unit 10 during a computer graphic drawing operation.

While a preferred embodiment has been illustrated and described, it will be apparent that many changes may be made in the general construction and arrangement of the invention without departing from the spirit and cope thereof, and it is therefore desired that the invention not be limited to the exact disclosure, but only to the extent of the appending claims.

What is claimed is:

1. A computer graphic drawing apparatus having a housing unit adapted to be suitably held in hand for graphic drawing operation with a plurality of push buttons provided at a front portion thereof, a coarse adjusting device rotatably installed in the housing unit for drawing long lines and making coarse adjustments according to the movement of the housing unit, means for detecting said movement and producing electrical signals corresponding to said movement in the x and y directions, and an IC arrangement disposed in the housing unit and electrically connected to the push buttons and the coarse adjusting device for being coupled with a host computer through a transmission interface, said drawing apparatus comprising:

a fine adjusting means rotatably provided at one side of the housing unit for being continuously manipulated in all directions for making fine adjustments by a user's thumb during graphic drawing operations, said fine adjusting means being spaced apart from said push buttons and said coarse adjusting device, the distance between said fine adjusting means and said push buttons being determined to allow said manipulation of said fine adjusting means by the user's thumb while said user's middle fingers are in position adjacent said push buttons for operation thereof and movement of said housing;

a first rotary means of an X coordinate axis is disposed in the housing unit, having one end portion rotatably engaged with said fine adjusting means for being rotated along with said manipulation of said fine adjusting means in the X-axis direction;

a second rotary means of a Y coordinate axis disposed in the housing unit, having one end portion rotatably engaged with said fine adjusting means for being rotated along with said manipulation of said fine adjusting means in the Y-axis direction;

a first encoding means provided at another end portion of said first rotary means and electrically connected to the IC arrangement for producing encoding signals therefrom along with rotations of said first rotary means in the X-axis direction; and a second encoding means provided at another end portion of said second rotary means and electrically connected to the IC arrangement for producing encoding signals therefrom along with rotations of said first rotary means in the Y-axis direction, when said fine adjusting means is rotatably and continuously manipulated through a user's thumb to make fine movement in all directions during a computer graphic drawing operation, fine adjustment in the X-axis and Y-axis directions will be effected on an associated CRT of the host computer.

2. A computer graphic drawing apparatus according to claim 1 wherein said first encoding means comprises:

a first rotary disc encoding member having a plurality of light traveling apertures evenly spaced therein and rotatably disposed at another end of said first rotary means for being driven to rotate therewith;

a first light shielding plate having a plurality of light passing holes provided therein and fixed in the housing unit over said first rotary disc encoding member at an end of said first rotary means;

a first light transmitting means disposed in the housing unit in front of said first light shielding plate and electrically connected to the IC arrangement for transmitting light therefrom; and a first light receiving means disposed in the housing unit in front of said first rotary disc encoding member in conjunction with said first light transmitting means and electrically connected to the IC arrangement for converting light signals received from said first light transmitting means into electrical signals, said signals being fed into the IC arrangement and the host computer in effecting fine adjustment on X-axis coordinate basis whenever said fine adjusting means is manipulated to move in a X direction.

3. A computer graphic drawing apparatus according to claim 2 wherein said second encoding means comprises:

a second rotary disc encoding member having a plurality of light traveling apertures evenly spaced therein and rotatably disposed at another end of said second rotary means for being driven to rotate therewith;

a second light shielding plate having a plurality of light passing holes provided therein and fixed over said second rotary disc encoding member at an end of said second rotary means;

a second light transmitting means disposed in the housing unit in front of said second light shielding plate for transmitting light therefrom; and a second light receiving means disposed in the housing unit in front of said second rotary disc encoding member in conjunction with said second light transmitting means for converting light signals received from said second light transmitting means into electrical signals said signals being fed into the IC arrangement and the host computer in effecting fine adjustment on a Y-axis coordinate basis whenever said fine adjusting means is manipulated to move in a Y direction.

4. A computer graphic drawing apparatus as claimed in claim 1 wherein said coarse adjusting device includes a first ball mounted for rotation when said housing unit is moved in a computer graphic drawing operation, and said fine adjusting means includes a second ball for rotation by the user's thumb in a computer graphic drawing operation.

5. A computer graphic drawing apparatus having a housing unit adapted to be suitably held in hand for graphic drawing operation with a plurality of push buttons provided at a portion thereof, a coarse adjusting device installed in said housing unit for drawing long lines and making coarse adjustments according to movement of said housing unit, means for detecting said movement of said coarse adjusting device and for producing electrical signals corresponding to said movement of said coarse adjusting device in the X and Y directions, the improvement therein comprising:

a fine adjusting means rotatably installed in said housing unit for being manipulated by the user's thumb during computer graphic drawing operations, said fine adjusting means being spaced apart from said push buttons and said coarse adjusting device, the distance between said fine adjusting means and said push buttons being determined to allow said manipulation of said fine adjusting means by the user's thumb while said user's middle fingers are in position adjacent said push buttons for operation thereof and for movement of said housing unit;

means for detecting said manipulation of said fine adjusting means and producing electrical signals corresponding to said manipulations in the X and Y directions.

6. A computer graphic drawing apparatus as claimed in claim 5, wherein said fine adjusting means includes a first ball for said manipulation by the user.

7. A computer graphic drawing apparatus as claimed in claim 6, wherein said coarse adjusting device includes a second ball, said second ball moving when said housing unit is moved.

* * * * *